United States Patent [19]
Rush

[11] 4,183,615
[45] Jan. 15, 1980

[54] COUPLINGS AND TERMINALS FOR OPTICAL WAVEGUIDES

[75] Inventor: Derek A. Rush, Emsworth, England

[73] Assignee: Smiths Industries Limited, London, England

[21] Appl. No.: 779,418

[22] Filed: Mar. 18, 1977

[30] Foreign Application Priority Data

Mar. 18, 1976 [GB] United Kingdom ............... 11021/76

[51] Int. Cl.² .............................................. G02B 5/14
[52] U.S. Cl. .................................................. 350/96.21
[58] Field of Search ........ 350/96 C; 339/205, 255 RT, 339/256 RT, 256 S

[56] References Cited

U.S. PATENT DOCUMENTS

| | | | |
|---|---|---|---|
| 3,086,190 | 4/1963 | Neidecker et al. | 339/205 |
| 3,455,625 | 7/1969 | Brumley et al. | 350/96 C |
| 3,508,807 | 4/1970 | Mayer | 350/96 C |
| 3,825,320 | 7/1974 | Redfern | 350/96 C X |
| 3,912,364 | 10/1975 | Hudson | 350/96 C |
| 3,948,582 | 4/1976 | Martin | 350/96 C |
| 4,008,948 | 2/1977 | Dalgleish et al. | 350/96 C |
| 4,062,624 | 12/1977 | Hammer | 350/96 C |
| 4,065,203 | 12/1977 | Goell et al. | 350/96.20 |
| 4,076,376 | 2/1978 | Slaughter | 350/96.21 |

FOREIGN PATENT DOCUMENTS

836764 3/1961 United Kingdom.

*Primary Examiner*—Rolf G. Hille
*Attorney, Agent, or Firm*—Pollock, Vande Sande & Priddy

[57] ABSTRACT

An optical waveguide coupling comprises a connector having a longitudinal bore and a pair of optical waveguides, for example, optical fibres, whose ends are disposed in opposite ends of the longitudinal bore with the waveguide ends optically coupled to one another. The connector comprises a generally tubular body and a multiplicity of flexible elongate members mounted on the tubular body and extending longitudinally therethrough to define the longitudinal bore, the elongate members being spaced apart around the tubular body and being individually displaceable towards the tubular body. The flexible elongate members are displaced towards the tubular body by the ends of the optical waveguides and resiliently engage the ends of the optical waveguides to maintain them in alignment with one another. The optical waveguide coupling may form part of an optical waveguide terminal comprising a housing in which is mounted a connector as aforesaid and a lens means for transmitting light from an end of one of the waveguides. In these circumstances, an end of the waveguides remote from the other of the waveguides is disposed at a focal point of the lens means.

24 Claims, 10 Drawing Figures

COUPLINGS AND TERMINALS FOR OPTICAL WAVEGUIDES

BACKGROUND OF THE INVENTION

This invention relates to couplings and terminals for optical waveguides.

Various couplings have been proposed for coupling optical fibres or bundles of optical fibres, where the ends of the waveguides abut one another. This is commonly referred to as splicing of the optical fibres. It is necessary axially to align the ends of the individual fibres or bundles of optical fibres with one another to provide the required degree of optical coupling between the fibres, and, heretofor, various forms of coupling devices have been proposed to provide this axial alignment and thus maximise the optical coupling between the fibres. Such coupling devices are often rather complicated and thus relatively expensive or involve the use of somewhat complicated methods of mounting the fibre ends in the coupling devices.

SUMMARY OF THE INVENTION

It is one object of the present invention to provide an optical waveguide coupling which substantially overcomes the aforementioned disadvantages.

According to a first aspect of the present invention, there is provided an optical waveguide coupling comprising a connector having a longitudinal bore and a pair of optical waveguides whose ends are disposed in opposite ends of the longitudinal bore with the waveguide ends optically coupled to one another, wherein the connector comprises a generally tubular body and a multiplicity of flexible elongate members mounted on the tubular body and extending longitudinally therethrough to define the said longitudinal bore, the elongate members being spaced apart around the tubular body and being individually displaceable towards the tubular body, and wherein the flexible elongate members are displaced towards the tubular body by the ends of the optical waveguides and resiliently engage the ends of the optical waveguides to maintain them in alignment with one another.

The ends of each of the flexible elongate members may be angularly displaced with respect to one another about the longitudinal axis of the tubular body. In such a case, the ends of each of the flexible elongate members may be displaced in the same sense about the longitudinal axis of the tubular body.

The flexible elongate members may extend parallel to one another, and may be of circular cross-section. They may be formed of metal.

The optical waveguides may be of circular cross-section and may comprise optical fibres.

The coupling may include means engaging the ends of the optical waveguides to anchor them in the said connector.

Such anchorage means may comprise a sleeve of heat-shrinkable material heat-shrunk onto the connector and the ends of the optical waveguides. Alternatively, the anchorage means may comprise tubular portions of a deformable material provided on the connector and through which the ends of the optical waveguides extend, the tubular portions being deformed to grip the ends of the optical waveguides.

According to a second aspect of the present invention, there is provided a method of coupling a pair of optical waveguides, comprising forming a connector having a longitudinal bore in which a pair of optical waveguides are to be optically coupled to one another, the connector having a generally tubular member and multiplicity of flexible elongate members mounted on the tubular body and extending longitudinally therethrough to define the said longitudinal bore, the elongate members being spaced apart around the tubular body and being individually displaceable towards the tubular body, and displacing the elongate members towards the tubular body by inserting the ends of the optical waveguides into respective ends of the longitudinal bore to cause the elongate members resiliently to engage the ends of the optical waveguides and maintain them in alignment with one another.

One of the optical waveguides may be a short optical waveguide terminating adjacent an end of the longitudinal bore.

It is sometimes required to provide couplings for optical waveguides in which the optical waveguides can be readily coupled to, or uncoupled from, one another. In such couplings, it is common practice to provide a pair of lenses for optically coupling the ends of the optical waveguides. The lenses are mounted in respective terminals of the coupling. In order to provide optimum optical coupling between the waveguides, it is necessary accurately to position the waveguides at focal points of the respective lenses.

This accurate positioning of the ends of the waveguides tends to be rather difficult and time consuming and it is another object of the present invention to provide couplings and terminals for optical waveguides in which the mounting of the waveguides is considerably simplified.

According to a third aspect of the present invention, there is provided a terminal for an optical waveguide, including a connector having a longitudinal bore in which an end of an optical waveguide is to be anchored, lens means for transmitting light from one end of the waveguide, and a housing in which the connector and lens means are mounted, wherein the terminal includes an elongate optical member mounted in the connector for optically coupling a waveguide to the lens means, one end of the optical member extending partially through the connector while the other end thereof is disposed at a focal point of the lens means, and wherein the connector includes means for maintaining the one end of the optical member and an end of an optical waveguide in alignment with one another.

With such a terminal, the mounting of an optical waveguide in the terminal is considerably simplified, it being necessary merely to insert the end of the optical waveguide into the connector until it engages and is spliced to the one end of the elongate optical member.

The longitudinal axis of the bore may pass through the said focal point of the lens means; the other end of the optical member may project from the connector.

The connector means may be resilient means.

The connector may comprise a tubular body and a multiplicity of flexible elongate members mounted on the body and extending longitudinally through the body, the flexible elongate members being spaced apart around the body resiliently engaging the elongate optical member.

The ends of each of the flexible elongate members may be displaced with respect to one another about the longitudinal axis of the tubular body.

The ends of each of the flexible elongate members may be displaced in the same sense about the longitudinal axis of the tubular body, and, in such a case, the flexible elongate members may extend parallel to one another.

The lens means may comprise a biconvex lens, and the elongate optical member may comprise an optical fibre.

The terminal may include means for engaging an end of an optical waveguide to anchor the optical waveguide in the connector. the terminal may include an optical waveguide anchored in the connector and spliced to the elongate optical member.

According to a further aspect of the present invention there is provided a coupling for a pair of optical waveguides comprising a pair of terminals as aforesaid.

BRIEF DESCRIPTION OF THE DRAWINGS

Various forms of couplings and terminals for optical waveguides in accordance with the present invention will now be described, by way of example, with reference to the accompanying drawings in which.

DETAILED DESCRIPTION OF THE PREFERRED EMBODIMENTS

The connectors shown in FIGS. 1 to 6 each have a generally tubular body and a multiplicity of flexible elongate members extending through the tubular body and spaced apart around the body to define a longitudinal bore. The ends of a pair of optical fibres are disposed in opposite ends of the longitudinal bore. The diameter of these optical fibres is slightly greater than the diameter of the longitudinal bore defined by the flexible elongate members so that the elongate members are deformed outwardly by the optical fibres and resiliently engage the fibres to grip them and maintain them in axial alignment with one another.

Figure 1:
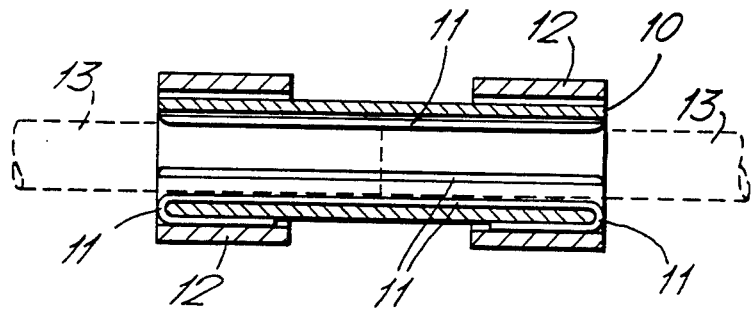
FIG. 1 is a sectional side view of a connector of an optical waveguide coupling.
Figure 2:
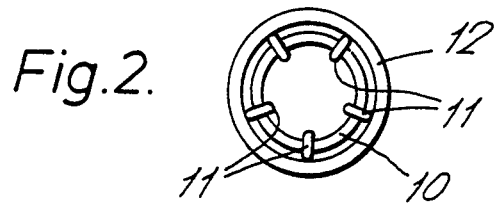
FIG. 2 is an end view of the connector of FIG. 1.

Referring to FIGS. 1 and 2, the connector includes a tube 10 of a metal, such as brass, or plastic, on which are mounted five wires 11 of resilient metal, such as for example, stainless steel, copper alloy or phosphor bronze, that extend longitudinally through the bore of the tube 10 and are equally spaced around the tube. The wires 11 are tensioned with the ends of the wires being folded over the ends of the tube 10, and clamped to the tube 10 and maintained under tension, by rings 12 of, for example, brass or plastics. The wires 11 extend parallel to one another, with the ends of each wire being angularly displaced with respect to one another about the longitudinal axis of the tube 10 so that intermediate portions of the wires 11 are spaced from the inner surface of the tube 10. This angular displacement of the ends of the wires 11 is of the order of 1.5 degrees. The ends of the tube 10 are slotted to receive the wires 11. With such a connector, the portions of the wires 11 within the tube 10 are slightly spaced from the tube, the degree of such displacement gradually increasing towards the centre of the tube and thereafter gradually decreasing towards the other end of the tube 10. Thus the bore defined in the tube 10 by the wires 11 is of smallest diameter at the centre of the tube. The bore diameter at the centre of the tube 10 is arranged to be slightly smaller than the diameter of optical fibres 13 (shown in dashed outline in FIG. 1) inserted into the ends of the connector so that during such insertion of the fibre ends, the intermediate portions of the wires 11 are deformed outwardly towards the wall of the tube 10. The resilience of the wires 11 causes them to grip the ends of the fibres 13 and thereby align them with one another and maintain them in axial alignment.

The ends of the fibres 13 are inserted into the connector one at a time, the end of the first fibre inserted into the connector being pushed completely through the tube 10, cleaned to remove any dirt from that end and then withdrawn into the tube until the fibre end is disposed in the centre of the tube. The end of the other fibre 13 is then cleaned and inserted into the tube 10 until it firmly abuts, and is thus spliced to, the other fibre end. One or both of the fibre ends, before being inserted into the connector, may be coated with a fluid having the desired optical characteristics to maximise the optical coupling between the fibres. This fluid may be one having adhesive properties so as additional to join together the fibre ends. In addition or alternatively, the space between the tube 10 and the fibre ends may be filled with an epoxy adhesive to anchor the fibre ends in the tube.

The fibre 13, may comprise single fibres or bundles of fibres.

Figure 3:
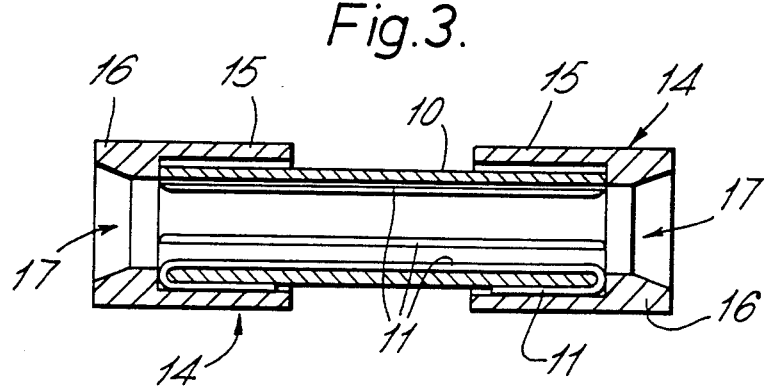
FIG. 3 is a sectional side view of one modified form of the connector of FIGS. 1 and 2.

In order to assist insertion of these fibres, and especially single fibres, into the tube 10, the tube may carry end pieces having tapered holes to receive the fibre ends. Such a coupling device is shown in FIG. 3 where the rings 12 are replaced by end pieces 14 of metal or plastic having annular portions 15 which clamp the ends of the wires 11 to the tube 10, and end portions 16 which project from the ends of the tube 10 and have tapered holes 17 therein to receive the fibre ends.

Figure 4:
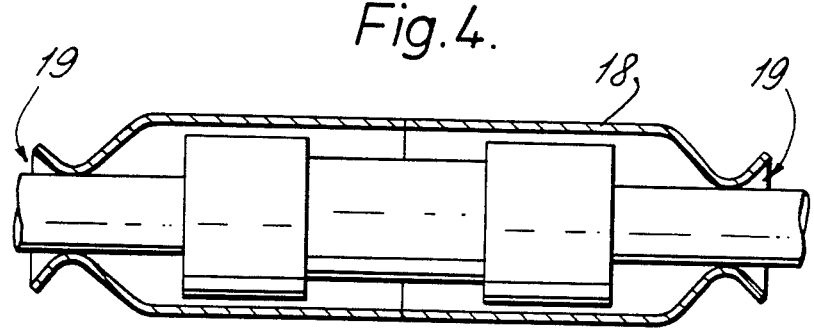
FIGS. 4 and 5 are side views, partly in section, of a further modified form of the connector of FIGS. 1 and 2.
Figure 5:
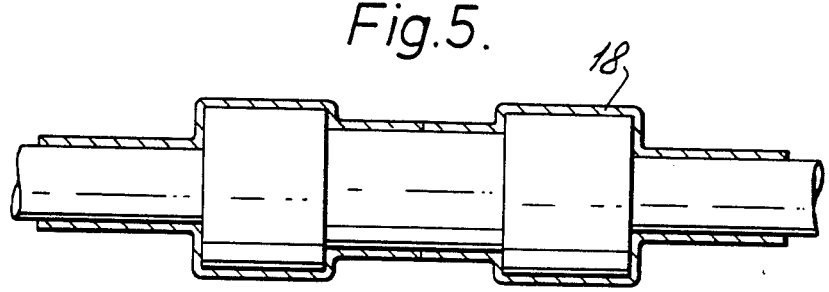

It is visualised that it may be necessary to grip the ends of the fibres 13 firmly so as to maintain the splicing of the fibre ends and prevent withdrawal of the fibre ends from the connector. One form of connector for this purpose is shown in FIGS. 4 and 5 where the connector is disposed within a sleeve 18 of heat-shrinkable plastic shaped, as shown in FIG. 4, to provide tapered apertures 19 to receive the fibre ends. When the sleeve 18 is heated it shrinks as shown in FIG. 5 to grip the connector and the fibre ends to prevent relative movement of those parts. The sleeve 18 is in two parts which are slidably mounted on respective ones of the fibre ends before those ends are inserted into the connector. One of the fibre ends is then inserted into the connector and the respective sleeve part 18 heat shrunk on to that fibre end and the connector, before the other fibre end is inserted into the connector.

Figure 6:
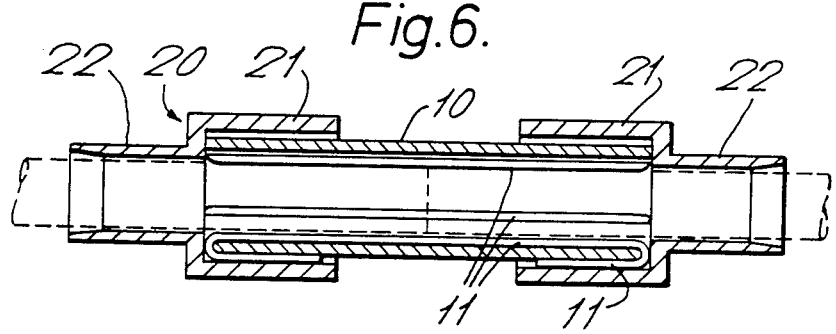
FIG. 6 is a sectional side view showing a still further modified form of the connector of FIGS. 1 and 2.

An alternative form of connector for gripping the fibres 13 is shown in FIG. 6 where the rings 12 are replaced by end pieces 20 of a deformable metal or plastic having annular portions 21 which clamp the ends of the wires 11 to the tube 10 and end portions 22 which project from the ends of the tube and define sleeves to receive the optical fibres 13. When the ends of the fibres 13 have been inserted into the connector and spliced to one another, the sleeves 22 are crimped to grip the fibres 13 and prevent their withdrawal from the connector.

Various other arrangements may be provided to inhibit withdrawal of the fibre ends. For example, the rings 12 of FIGS. 1 and 2 may carry respective end pieces (not shown) which are externally threaded and have pairs of diametrically opposed projections whose free ends are spaced to define a gap through which the respective fibre ends are inserted into the connector. The end pieces carry nuts which when screwed on to the end pieces engage the respective pairs of projections to urge their free ends into engagement with the fibre ends to grip them tightly and prevent the fibres being withdrawn from the connector.

It is visualised that the couplings described with reference to FIGS. 1 to 6 may include optical waveguides other than optical fibres.

In the couplings described previously, the ends of the pairs of optical fibres are permanently coupled to one another. However, it is sometimes required to uncouple the ends of the fibres and, in these circumstances, it is common practice to provide a coupling having individual terminals for the optical fibres that can be uncoupled from one another. In these forms of couplings the ends of the optical fibres are coupled via lenses mounted in the terminals.

Figure 7:
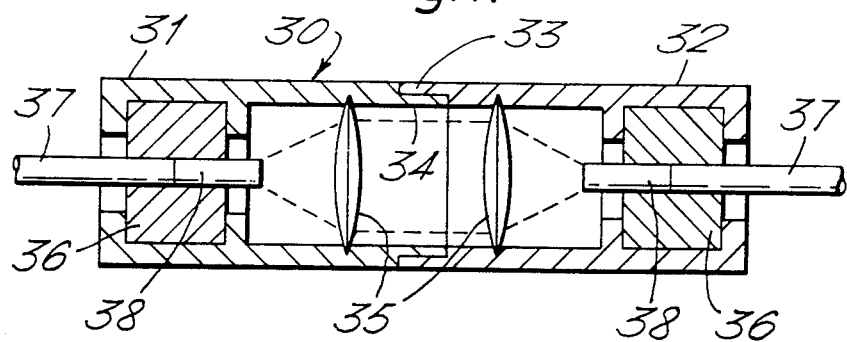
FIG. 7 is a sectional side view of an optical waveguide coupling having waveguide terminals which may be uncoupled from one another.

One form of such a coupling in accordance with the present invention is shown in FIG. 7. Referring to FIG. 7, the coupling comprises a pair of optical terminals for optical fibres and includes a tubular housing 30 having two parts 31 and 32. These parts 31 and 32 have, respectively, an annular projection 33 at an end of one part and an annular recess 34 on the other part to receive the annular projection and permit coupling and decoupling of the two parts. The terminal parts 31 and 32 each house a biconvex lens 35, and a connector 36 for receiving the end of an optical fibre 37 which is to be optically coupled to the lens 35. The connectors 36 are each of the form previously described with reference to, for example, FIGS. 1, 2, and 3.

It is necessary accurately to position the ends of the optical fibres at the focal points of the respective lenses 35 and this is achieved by mounting within the connectors 36 respective short lengths 38 of optical fibres having dimensions and optical characteristics substantially identical to the dimensions and optical characteristics of the fibres 37. These fibre lengths 38 are accurately positioned in the connectors 36 prior to the connectors being mounted in the housing 30, with one end of the fibre lengths 38 being positioned midway along the length of the respective connectors while the other ends of the fibre lengths 38 project from one end of the respective connectors by an appropriate distance. The fibre lengths 38 are secured in position by an epoxy adhesive. The connectors 36 are then inserted into the respective ends of the housing parts 31 and 32 remote from the lenses 35 and these ends are then turned over to mount the connectors 36 in the housing parts with the said other ends of the fibre lengths 38 being disposed at the focal points of the respective lenses 35.

When it is required to couple a pair of optical fibres 37, it is necessary merely to insert the ends of these fibres into the respective connectors 36 until they abut, and are spliced to, the ends of the respective fibre lengths 38. This simplifies considerably the mounting of the fibres 37.

The fibres 37 may be secured in the connectors 36 by an epoxy adhesive.

In order to provide the required degree of coupling between the fibres 37, it may be necessary for the ends of the fibre lengths 38 to be highly polished and in these circumstances the ends of the lengths 38 may be polished before these lengths are disposed in the connectors 36.

The ends of the fibres 37 may be coated with a fluid having the desired optical characteristics to maximise the optical coupling between these fibres and the fibre lengths 38 before the fibres 37 are inserted into the connectors 36. This fluid is conveniently one which also adhesively bonds the ends of the fibres 37 to the fibre lengths 38.

Figure 8:
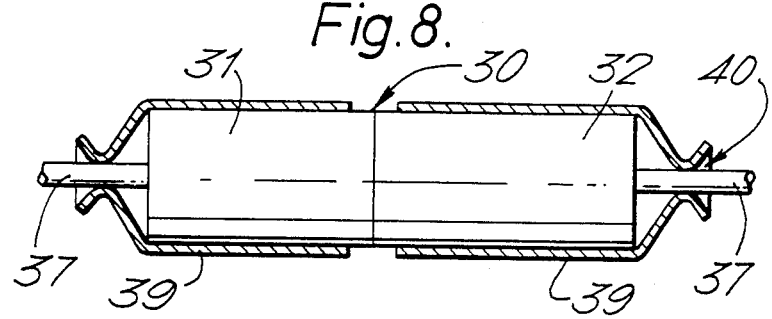
FIGS. 8 and 9 are side views of a first modified form of the coupling of FIG. 7.
Figure 9:
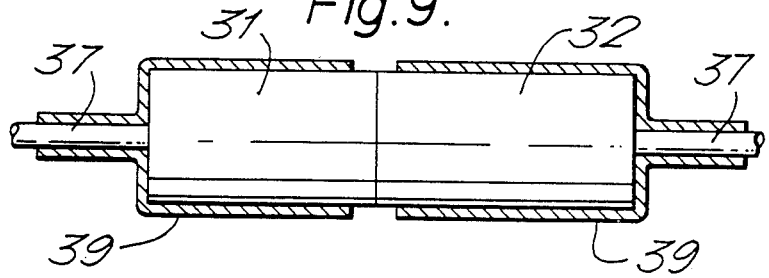

It is visualised that it may be necessary to grip the ends of the fibres 37 firmly so as to prevent withdrawal of the fibre ends from the connectors 36 and thereby maintain the splicing between these fibre ends and the fibre lengths 38. One form of coupling for this purpose is shown in FIGS. 8 and 9 where the parts 31 and 32 of the housing 30 are disposed within respective sleeves 39 of heat-shrinkable plastic shaped as shown in FIG. 8 to provide tapered apertures 40 to receive the ends of the fibres 37. When the sleeves 39 are heated, they shrink, as shown in FIG. 9, to grip the respective parts 31 and 32, and the ends of the fibres 37, to inhibit withdrawal of the fibres 37 from the connectors 36. The sleeves 39 are slidably mounted on the fibres 37 before they are inserted in the connectors 36 and thereafter slid over the ends of the parts 31 and 32 and heat shrunk.

Figure 10:
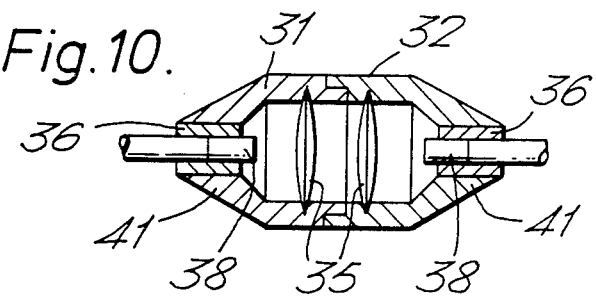
FIG. 10 is a sectional side view of a second modified form of the coupling of FIG. 7.

The coupling of FIG. 7 may be of various other shapes. For example, the housing may be as shown in FIG. 10 where the connectors 36 are mounted in tapered end portions 41 of the housing parts 31 and 32. Such a housing may be of plastic and in these circumstances the lenses 35 and the connectors 36 may be moulded as inserts in the housing parts 11 and 12.

It is visualised that the single optical fibres 37 and fibre lengths 38 may be replaced by bundles of optical fibres or by other optical waveguides. Also the couplings of FIGS. 7 and 10 may be for coupling an optical fibre to a light-sensitive device instead of another optical fibre.

I claim:

1. An optical waveguide coupling comprising a connector having a longitudinal bore and a pair of optical waveguides whose ends are disposed in opposite ends of the longitudinal bore with the waveguide ends optically coupled to one another, wherein the connector comprises a generally tubular body and a multiplicity of flexible elongate members mounted on the tubular body and extending longitudinally therethrough to define the said longitudinal bore, the elongate members being spaced apart around the tubular body and being individually displaceable towards the tubular body, and wherein the flexible elongate members are displaced towards the tubular body by the said ends of the optical waveguides and resiliently engage the ends of the optical waveguides to maintain them in alignment with one another.

2. An optical waveguide coupling according to claim 1, wherein the ends of each of the flexible elongate members are angularly displaced with respect to one another about the longitudinal axis of the tubular body.

3. An optical waveguide coupling according to claim 2, wherein the ends of each of the flexible elongate members are displaced in the same sense about the longitudinal axis of the tubular body.

4. An optical waveguide coupling according to claim 1, wherein the flexible elongate members extend parallel to one another.

5. An optical waveguide coupling according to claim 1, wherein the flexible elongate members are of circular cross-section.

6. An optical waveguide coupling according to claim 1, wherein the flexible elongate members are of metal.

7. An optical waveguide coupling according to claim 1, wherein the optical waveguides are of circular cross-section.

8. An optical waveguide coupling according to claim 1 wherein the optical waveguides comprise optical fibres.

9. An optical waveguide coupling according to claim 1, including means engaging the ends of the optical waveguides to anchor them in the said connector.

10. An optical waveguide coupling according to claim 9, wherein the said anchorage means comprises a sleeve of heat-shrinkable material heat-shrunk on to the connector and the ends of the optical waveguides.

11. An optical waveguide coupling according to claim 9, wherein the said anchorage means comprises tubular portions of a deformable material provided on the connector and through which the ends of the optical waveguides extend, the tubular portions being deformed to grip the ends of optical waveguides.

12. An optical waveguide coupling according to claim 1, wherein one of the optical waveguides terminates adjacent one end of the said longitudinal bore.

13. A method of coupling a pair of optical waveguides, comprising forming a connector having a longitudinal bore in which a pair of optical waveguides are to be optically coupled to one another, the connector having a generally tubular body and a multiplicity of flexible elongate members mounted on the tubular body and extending longitudinally therethrough to define the said longitudinal bore, the said elongate members being spaced apart around the tubular body and being individually displaceable towards the tubular body, and displacing the said elongate members towards the said tubular body by inserting the ends of the said optical waveguides into respective ends of the said longitudinal bore to cause the said elongate members resiliently to engage the ends of the optical waveguides and maintain them in alignment with one another.

14. A terminal for an optical waveguide, including a connector comprising a generally tubular body and a multiplicity of flexible elongate members mounted on the body, the flexible elongate members being spaced apart around the body and extending longitudinally therethrough to define a longitudinal bore in which one end of an optical waveguide is to be anchored, lens means for transmitting light from one end of the waveguide, and a housing in which the connector and lens means are mounted, wherein the terminal includes an elongate optical member for optically coupling a said waveguide to the lens means, one end of said optical member extending partially through the longitudinal bore of the connector and being resiliently engaged by the flexible elongate members while the other end thereof is disposed at a focal point of the lens means.

15. A terminal according to claim 14, wherein the longitudinal axis of the said bore passes through the said focal point of the lens means.

16. A terminal according to claim 14, wherein the said other end of the optical member projects from the connector.

17. A terminal according to claim 14, wherein the ends of each of the said flexible elongate members are displaced with respect to one another about the longitudinal axis of the tubular body.

18. A terminal according to claim 17, wherein the ends of each of the flexible elongate members are displaced in the same sense about the longitudinal axis of the tubular body.

19. A terminal according to claim 18, wherein the flexible elongate members extend parallel to one another.

20. A terminal according to claim 14, wherein the flexible elongate members are of circular cross-section.

21. A terminal according to claim 14, wherein the lens means comprises a biconvex lens.

22. A terminal according to claim 14, wherein the elongate optical member comprises an optical fibre.

23. An optical waveguide coupling comprising a pair of terminals for respective optical waveguides having means to permit the terminals to be optically coupled to, and uncoupled from, one another, each terminal including a connector comprising a generally tubular body and a multiplicity of flexible elongate members mounted on the body, the flexible elongate members being spaced apart around the body and extending longitudinally therethrough to define a longitudinal bore in which an end of a respective said optical waveguide is to be anchored, lens means for transmitting light from one end of a respective said waveguide, and a housing in which the respective connector and lens means are mounted, wherein each terminal includes an elongate optical member mounted in its connector for optically coupling a said waveguide to the lens means of that terminal, one end of said elongate optical member extending partially through the longitudinal bore of its respective connector and being resiliently engaged by the flexible elongate members of that connector while the other end thereof is disposed at the focal point of the respective said lens means.

24. An optical waveguide terminal including a connector comprising a generally tubular body and a multiplicity of flexible elongate members mounted on the tubular body and extending longitudinally therethrough to define a longitudinal bore having first and second ends, the elongate members being spaced apart around the tubular body and being individually displaced towards the tubular body, wherein the said terminal further includes a first optical waveguide having one end mounted in the said first end of the said longitudinal bore, lens means disposed adjacent the said second end of the longitudinal bore for transmitting light from said end of a first optical waveguide, a housing in which the said connector and said lens means are mounted, and a second optical waveguide having a first end mounted in the said second end of the said longitudinal bore and optically coupled to the said end of the first optical waveguide, and having a second end disposed at a focal point of the said lens means and wherein the flexible elongate members are displaced towards the tubular body by the ends of the optical waveguides within the said longitudinal bore and resiliently engage those ends of the optical waveguides to maintain them in alignment with one another.

* * * * *